United States Patent [19]
Villata

[11] Patent Number: 5,730,268
[45] Date of Patent: Mar. 24, 1998

[54] HYDRAULIC MOTOR VEHICLE CLUTCH HAVING WEAR INDICATING MEANS

[75] Inventor: Gino Villata, Buttigliera D'Asti, Italy

[73] Assignee: Valeo, Paris, France

[21] Appl. No.: 464,829

[22] PCT Filed: Sep. 20, 1994

[86] PCT No.: PCT/FR94/01094

§ 371 Date: May 25, 1995

§ 102(e) Date: May 25, 1995

[87] PCT Pub. No.: WO95/09311

PCT Pub. Date: Apr. 6, 1995

[30] Foreign Application Priority Data

Sep. 29, 1993 [FR] France ................. 93 11576

[51] Int. Cl.[6] .............. F16D 25/08; F16D 25/12
[52] U.S. Cl. .............. 192/85 CA; 192/30 W; 192/91 A
[58] Field of Search ............ 192/85 CA, 30 W, 192/91 A, 98

[56] References Cited

U.S. PATENT DOCUMENTS

| | | |
|---|---|---|
| 3,955,660 | 5/1976 | Poon et al. . |
| 4,684,003 | 8/1987 | Leigh-Monstevens ........... 192/85 CA |
| 5,058,718 | 10/1991 | Tojima et al. ........... 192/30 W |
| 5,113,989 | 5/1992 | Feigler . |
| 5,181,593 | 1/1993 | Flotow et al. ........... 192/30 W |
| 5,207,306 | 5/1993 | Sato et al. ........... 192/30 W |

FOREIGN PATENT DOCUMENTS

| | | |
|---|---|---|
| 0 497 164 | 8/1992 | European Pat. Off. . |
| 2304826 | 10/1976 | France . |
| 2 674 922 | 10/1992 | France . |
| 28 15 971 | 10/1979 | Germany . |
| 30 447 746 | 4/1982 | Germany . |
| 2 110 334 | 6/1983 | United Kingdom . |
| 2 124 321 | 2/1984 | United Kingdom . |
| 2 174 169 | 10/1986 | United Kingdom . |

*Primary Examiner*—Rodney H. Bonck
*Attorney, Agent, or Firm*—Longacre & White

[57] ABSTRACT

A hydraulic clutch having a device for indicating wear in the friction liners of the clutch. A wear indicating member (44) is coupled to the actuating piston (26, 34) for axial straight line movement. The wear indicating member (44) projects outside the clutch casing (10) to mechanically transmit information relating to the displacement of the actuating piston (26).

12 Claims, 2 Drawing Sheets

HYDRAULIC MOTOR VEHICLE CLUTCH HAVING WEAR INDICATING MEANS

BACKGROUND OF THE INVENTION

1. Field of the Invention

The present invention relates to a friction clutch, especially for motor vehicles.

More particularly the invention relates to a friction clutch of the hydraulic type.

2. Description of the Prior Art

Various designs of clutch are known that include a hydraulic actuating device which comprises at least one actuating piston, which is arranged to displace the clutch release bearing axially so as to disengage the clutch when the actuating device is supplied with fluid under pressure from a pressurised fluid source, such as for example a clutch cylinder.

One example of such a hydraulically actuated clutch is described and shown in the document U.S. Pat. No. 3,955, 660, in which the actuating piston is made in the form of a cylindrical sleeve mounted for sliding movement on a cylindrical guide surface fixed to the clutch casing.

Such a type of hydraulically actuated clutch, which does not include any mechanical fork for actuating the clutch release bearing, does not enable indirect wear measurement in the friction liners of the clutch to be taken by observation of the relevant position of the end of the actuating fork lying outside the clutch casing, in relation to a fixed reference of the latter.

Such a type of hydraulically actuated clutch also has other drawbacks, among which are those related to the supply of pressurised fluid to the actuating chamber of the hydraulic piston, which makes it necessary to have at least one pressurised fluid feed duct that extends inside the clutch casing, which has to be connected hydraulically to the actuating chamber and to the source of fluid under pressure, and for which, in order to protect it mechanically, it is in general necessary to provide means for preventing the actuating piston from rotating.

An object of the present invention is to propose a new design of hydraulically actuated clutch which overcomes the drawbacks mentioned above.

SUMMARY OF THE INVENTION

To this end, the invention proposes a friction clutch of the type comprising a clutch casing, within which there is arranged a clutch control device which comprises a clutch release bearing and a hydraulic actuating device comprising at least one actuating piston which is coupled to the clutch release bearing for axial straight line movement together, so as to urge the said release bearing in axial displacement, characterised in that it includes a device for indicating wear in the friction liners of the clutch and comprising a wear indicating member which is coupled to the actuating piston for axial straight line movement therewith, and which projects outside the casing via an aperture in the casing, so as to transmit mechanically information relating to the displacements of the actuating piston.

The invention makes it possible to measure wear in the friction liners visually, due to the fact that the indicating device projects outside the casing.

In addition, the aperture enables the piston to be prevented from rotating, by cooperation of the indicating device with the corresponding edge of the aperture.

To this end, the said aperture preferably has an oblong shape, being elongated parallel to the axis of axial sliding movement of the piston.

The size of the aperture depends on particular applications, and, in particular, on the wear in the friction liners.

In accordance with other features of the invention:

a first end portion of the wear indicating member is pivoted to the actuating piston, and the second end portion of the wear indicating member projects through a window of the casing, so as to be displaceable in relation to a member for measuring displacements of the said second end portion;

the measuring member is a graduated visual scale for measurement of the displacements of the second end portion of the wear indicating member;

the second end portion of the wear indicating member comprises a friction element which cooperates with an electrical potentiometer of the rheostatic type;

a first end portion of the wear indicating mender is coupled to the piston for axial straight line movement with it, and is pivoted on the latter about a pivot axis at right angles to the axis of axial sliding movement of the piston;

the pivot axis of the wear indicating member is offset radially with respect to the axis of the piston;

the first end portion of the wear indicating member is in the form of a fork;

the hydraulic actuating device includes a pressurised fluid supply circuit comprising at least one feed duct which connects the actuating chamber of the piston to a source of fluid under pressure arranged outside the casing, and at least part of the duct is formed in the body of the wear indicating member;

the body of the wear indicating mender includes a longitudinal duct, a first end of which is connected to the actuating chamber for the piston via means pivoting the first end portion of the wear indicating member on the piston;

the second end portion of the duct is open outside the clutch casing; and the supply circuit includes a purge duct, at least part of which is formed in the body of the wear indicating member. This member carries a threaded purge plug associated with the purge duct.

Thus it is possible to carry out purging from outside the casing in a more accessible position. In a modification, the threaded purge plug can of course be located outside the body of the wear indicating member.

Further features and advantages of the invention will appear on a reading of the detailed description which follows, for an understanding of which reference is made to the attached drawings, in which:

Figure 3:
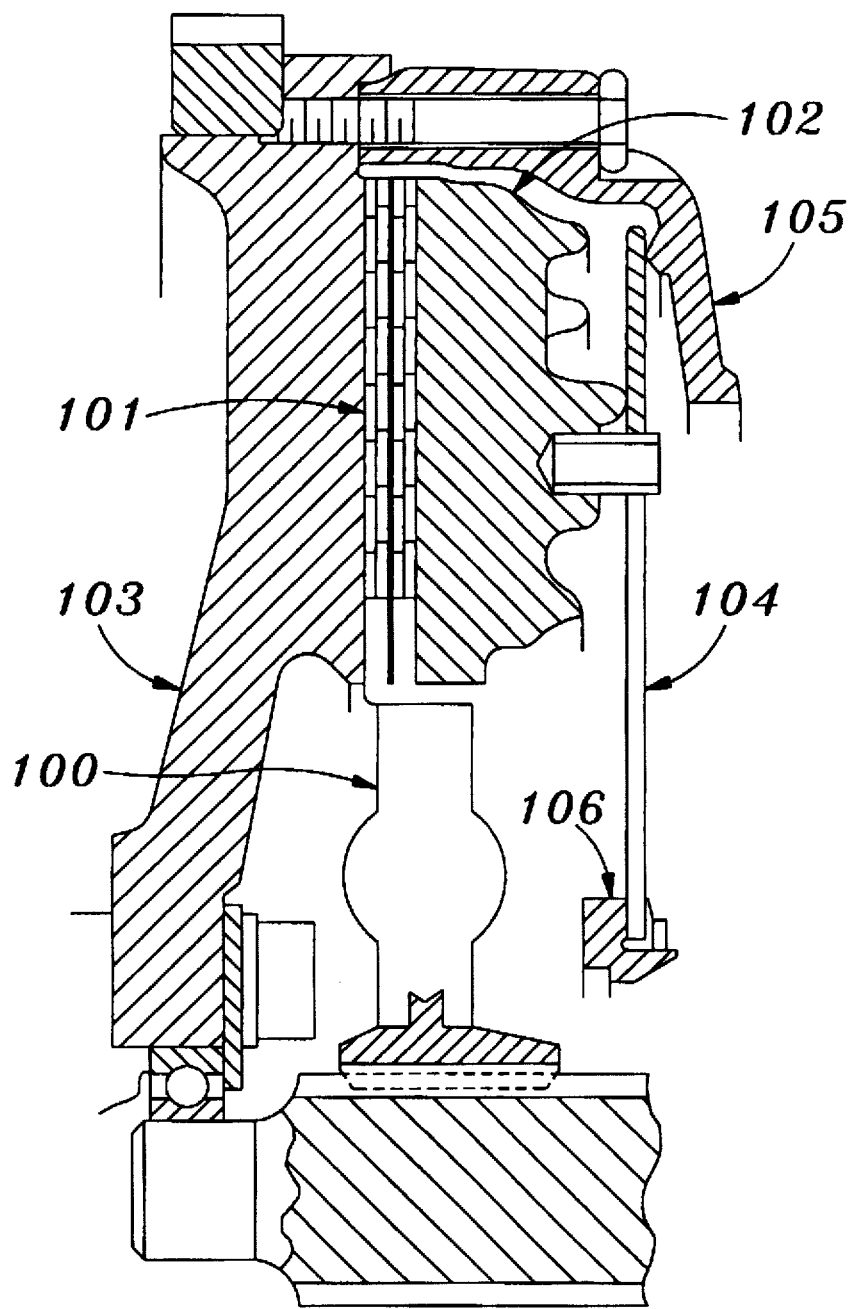
FIG. 3 is a view in cross-section of a prior art clutch.

The drawings show a clutch casing 10 which is part of a motor vehicle friction clutch of the hydraulically actuated "pull to release" type. The whole of the clutch is shown in FIG. 3, and will not be described in detail, and reference may be made, in particular, to the documents U.S. Pat. No. 3,995,660 and FR-A-2 304 826 for particulars of various embodiments.

It will be recalled that this clutch comprises a friction disc 100, fixed to the input shaft of the gearbox for rotation with it, and having friction liners 101 which are adapted to be clamped between the pressure 102 and reaction 103 plates of the clutch. These plates are fixed to the crankshaft of the engine for rotation with it, the pressure plate being movable axially with respect to the reaction plate.

Axially acting resilient means, such as a diaphragm 104 or coil springs associated with declutching levers, urge the pressure plate towards the reaction plate in order to clamp the friction liners.

These resilient means engage, for this purpose, on a cover plate which is fixed to the reaction plate 105.

In order to disengage the clutch, the ends of the fingers of the diaphragm or declutching levers, constituting the declutching device of the clutch, are acted on by means of the clutch release bearing 20, which in this example is controlled in traction by the hydraulic actuating device, which comprises, in a manner to be described below, an axially movable piston 26, 34, an axially fixed guide member 16, a hydraulic actuating chamber 38 of the piston 26, 34, and a supply circuit for fluid under pressure.

As the friction liners become worn, the pressure plate comes closer to the reaction plate, the diaphragm becomes inclined, and the clutch release bearing 20, coupled to the diaphragm, is displaced axially according to the inclination of the diaphragm.

The position of the clutch release bearing 20 thus varies according to the wear in the friction liners.

The casing 10 is generally in the form of a hood and has a radial end wall 12, on the inner surface 14 of which there is secured, axially and for rotation with this wall, a post 16 which may also be referred to as a horn, which defines a cylindrical outer engagement surface 18 defining an axial axis X—X.

The casing 10 encloses, in particular, a clutch release bearing 20 which essentially consists of a ball bearing 22, the outer ring 24 of which is in this example coupled in axial translational movement to an actuating sleeve 26, here by means of a shroud (which has no reference numeral) seamed in position, while the rotatable inner ring 28 of the bearing is extended by a sleeve portion 30 which includes, in particular, an external radial groove 32 which is arranged to receive means (not shown) for coupling by resilient axial insertion, to an actuating member 106 (FIG. 3) which in this example works on the diaphragm 104 of the clutch.

The clutch release bearing 20 is therefore coupled to the actuating sleeve 26 for axial straight line movement with it, the said sleeve 26 working on the said release bearing 20 through one of its ends.

For more details, reference can be made, for example, to the documents FR-A-2 653 195 (U.S. Pat. No. 5,113,989) or FR-A-2 304 826, in which the said coupling means comprise a coupling member such as a coupling ring or a ring having lugs which are radially deformable elastically, and which engage with the front flank of the groove 32 and with a surface of all actuating member which is connected to the declutching levers, or more commonly, to the ends of the fingers of the diaphragm.

Actuation of the clutch release bearing 20 is obtained by means of a hydraulic actuating device which includes an actuating piston constituted by the hollow cylindrical body 34 of the sleeve 26, the inner cylindrical surface 36 of which cooperates at the rear end with the cylindrical surface 18 to define a hydraulic actuating chamber 38. Tile post 16 thus constitutes a guide member for the piston 26, 34, with which it is thus in a piston and cylinder relationship.

The chamber 38 is delimited in the axial direction by two grooved rings 40 and 42 which are carried respectively by the piston 26, 34 and the horn 16. With this in view, the rear end portion of the piston 26, 34 has a collar portion which is directed towards the axis of the assembly, while the post 16 carries at its forward end a thrust ring which is located axially by means of a circlip. The grooved rings 40, 42 bear respectively on the said collar portion and the said thrust ring, with, interposed between them, a preloading spring which urges the release bearing 20 and the piston 26, 34 towards the wall 12, so as to exert a preloading force on the clutch and to ensure, in a manner known per se, correct operation of the ball bearing of the release bearing 20.

A bellows is of course arranged between the rear end of the piston 26, 34 and the rear end of the post 16.

When the actuating chamber 34 is supplied with fluid under pressure, by means which will be described later herein, it causes the piston 26, 34 to be displaced axially in the direction X—X and in the direction F1, from left to right in FIG. 1, in such a way as to cause the clutch to be declutched (or disengaged) through the clutch release bearing 20 acting, via the actuating mender, in traction on the declutching device of the clutch (i.e. the diaphragm or declutching levers).

Figure 2:
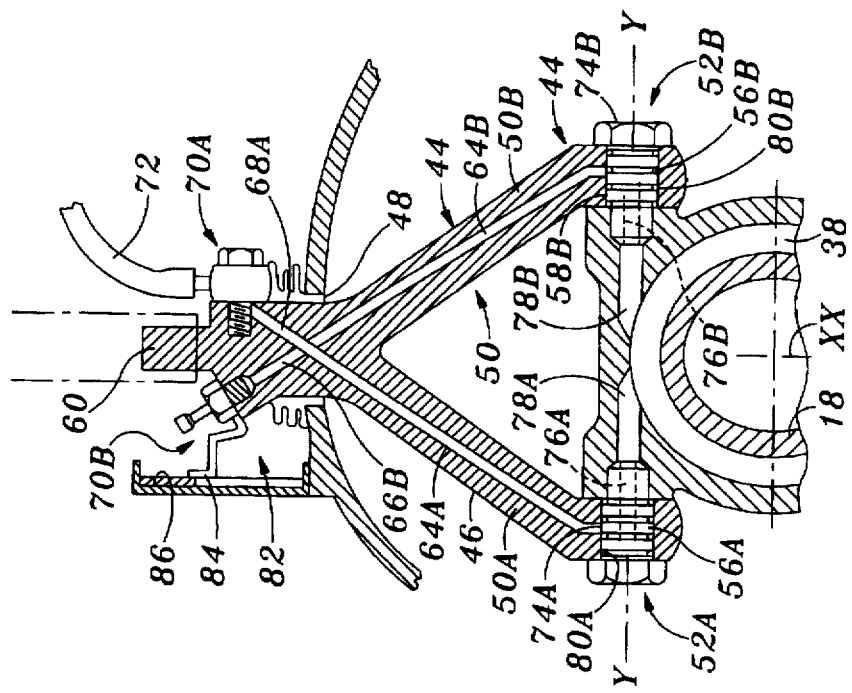
FIG. 2 is a view in cross section taken on the line 2—2 in FIG. 1.
Figure 1:
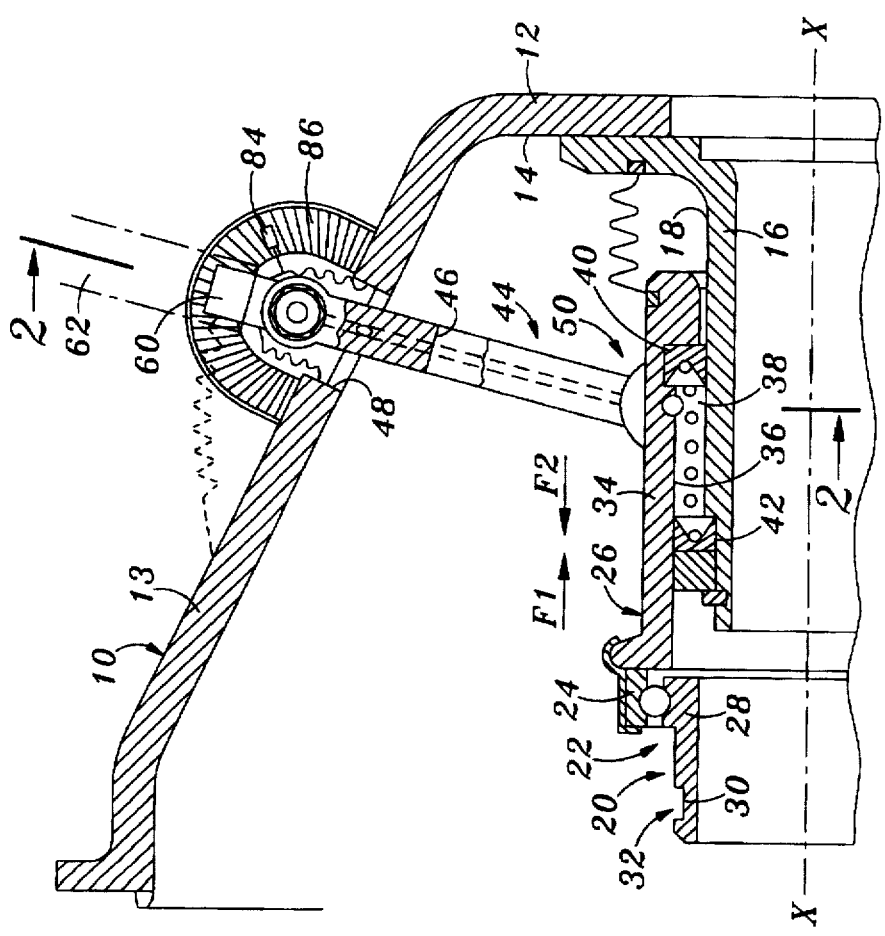
FIG. 1 is a diagrammatic view in axial cross section showing part of a clutch casing and the actuating device for the clutch release bearing which includes means for indicating wear made in accordance with the invention.

In accordance with the invention, there is provided a member for indicating wear in the friction liners (not shown) of the friction disc of the clutch, which is made in the form of a lever 44 in the embodiment shown in FIGS. 1 and 2. This lever 44 is coupled in axial translational movement with the piston 26, 34, being articulated on the latter. It projects from the casing 10.

More precisely, the lever 44 comprises a lever body 46 which passes through the conical portion 13 of the wall of the clutch casing 10, via an aperture 48 which in this example is oblong.

More precisely, this aperture is elongated in the axial direction parallel to the axis X—X along which the piston 26, 34 slides. Its size is determined according to the application, and, in particular, to the wear in the friction liners of the friction disc.

In this example the aperture 48 is in the form of a rectangular window, as can be seen in the drawings.

The lower end portion 50 of the lever 44, arranged inside the clutch casing 10, is made in the form of a fork comprising two arms 50A and 50B, which are coupled pivotally to the body 34 of the piston in the form of the sleeve 26.

For this purpose, each of the branches 50A, 50B of the fork-shaped end portion 50 has a pivot screw 52A, 52B passing through it, the threaded ends of these screws being screwed into the upper portion of the sleeve 34, with their bodies 56A, 56B extending through a corresponding hole formed in the end of the arm in such a way as to define a pivot axis Y—Y for pivoting of the lever 44 on the sleeve 34, which is offset radially outwardly with respect to the axis X—X of the sliding movement of the piston 34.

The second end portion 60 of the wear indicating member 44, in the form of a lever, projects out of the casing 10 so as to constitute a wear indicating cursor.

The position of the lever (i.e. its inclination) accordingly varies as a function of the axial displacement of the piston 26 and off the release bearing 20.

In the embodiment shown in FIGS. 1 and 2, the upper end portion 60 of the wear indicating member 44 is extended laterally by a cursor 82, which carries a friction pad 84 that cooperates with a rheostatic track 86, in the form of an arc of a circle, which is substantially centered on the center of the window 48 of the casing, so as to constitute a rheostatic potentiometer that transmits, to a display device (not shown), a signal representing the angular position of the wear indicating meter, comprising the lever 44, with respect to the casing 10.

The potentiometer 84, 86 accordingly enables the displacements of the wear indicating member 44 to be assessed and the maximum angular positions occupied by the latter to be determined, and thus enables the value of the progressive wear in the friction liners of the clutch to be deduced.

The invention accordingly proposes a device for indirectly measuring wear in the friction liners of the clutch according to the position of the piston 26, 34 axially coupled to the clutch release bearing 20.

This device extends partly outside the casing 10.

The invention is not limited to the embodiment having a rheostatic potentiometer, but includes any measuring device that is concerned with the relative position of the outer end portion 60 of the member 44 with respect to the casing 10, and this device can be a simple device for visually indicating the position of a cursor with respect to a reading scale, or any other device which enables a signal to be obtained that represents the wear in the friction liners in accordance with the position of the member 44.

In accordance with another aspect of the invention, the lever 44 includes part of the pressurised fluid supply circuit for the piston 26, 34.

To this end, the branch 50A includes a pressurised fluid feed duct 64A, an inner end 66A of which is connected to the actuating chamber 34, with its outer end 68A being connected, through a connector 70A, to a pressurised fluid pipe 72 which is itself connected to a clutch cylinder (not shown).

The end 66A of the duct 64A is open into a radial groove 74A of the smooth body portion of the screw 52A that defines the pivot axis, with the groove 74A being itself connected to an axial passage 76A formed within the screw, which is open into a coaxial duct 78A formed in the body 34 of the piston and open into the actuating chamber 34, in the upper part of the latter.

The joints are sealed by two O-rings 80A.

The second branch 50B of the fork-shaped lower end portion 50 of the lever 44 similarly has a longitudinal purge duct 64B, the upper end 68B of which is connected to a threaded purge plug 70B, with its inner end being connected to the chamber 38 through an arrangement identical to that at the lower end 66A of the feed duct 64A.

Thanks to this aspect of the invention, there is no longer a flexible duct inside the clutch casing, and also the piston 26, 34 is prevented in a simple manner from rotating, by means of the mechanical lever 44.

In this connection, the lever 44 is mounted with a clearance in the axial direction (i.e. parallel to the axis Y—Y) in the window 48, and with a smaller clearance in the other direction (i.e. that of the width) in the said window 48.

Finally, and as is indicated in phantom lines in FIGS. 1 and 2, it is possible to make use of the wear indicating lever 44 by exerting an external mechanical force on its end portion 60, so causing it to pivot, in the clockwise direction in FIG. 1, about a pivot point resulting from the contact of its body 46 with the corresponding edge of the window 48, thus causing the piston 34 to be displaced axially from right to left in FIG. 1, as indicated by the arrow F2.

This facility for mechanical actuation of the piston 26, 34, for example by means of a tool 62 shown in phantom lines in the drawings, can be employed during assembly of the clutch in order to secure the inner ring 28, 30 axially to the actuating member which acts on the declutching device of the clutch, most commonly the fingers of a diaphragm, all in accordance with a resilient axial mating technique such as that which is described and shown in the document FR-A-2 304 826.

For example the tool 62 may be hollow in form, and may cooperate in a complementary manner with the end portion 60 which is profiled accordingly, with the tool being fitted over the latter. It will be noted with reference to FIG. 2 that the window 48 enables the lever 44, and therefore the piston 26, 34, to be prevented from rotating in the manner described above. It also enables the interior of the casing to be ventilated.

The grooved rings 40, 42 are thus protected. With reference to FIG. 1, a clearance does of course exist between the lever 44 and the window 48, so as to enable the piston 26, 34 and clutch release bearing 20 to be displaced axially. The clearance is small in the plane of FIG. 2, so as to prevent the lever 44 from rotating.

The preloading spring, as can be seen in broken lines in FIG. 1, may of course, instead of acting on the two grooved rings 42, 40, act on the end portion 60 of the lever 44, in such a way as to urge the piston 26, 34 constantly towards the wall 12. Apart from giving satisfactory operation of the ball bearing of the release bearing 20, this arrangement prevents any vibration effects occurring at the lever 44. protective bellows are of course provided (FIG. 1) between the window 48 and the upper end portion 60 of the lever 44.

If necessary, a component of plastics material having a low coefficient of friction may be provided so as to define the perimeter of the window, and so to reduce noise and friction effects arising from the contact with the lever 44.

The oblong aperture 48 may of course be elongated axially and have rounded edges at each of its ends.

In general terms, this aperture 48 may have any shape whatever.

The invention is applicable to a clutch of the push to release type, in which the rotatable thrust ring of the clutch release bearing works in a thrust mode on the ends of the fingers of the diaphragm or of the declutching levers.

As is described in the document FR-A-2 304 826, the inner ring of the clutch release bearing 20 can of course be applied axially to the piston (i.e. coupled to the piston for axial straight line movement with it), while the outer ring may be rotatable, being fitted in axial nesting relationship on the associated actuating member.

The appropriate ring may for example be force-fitted on the end of the piston, which for this purpose is then formed with a shoulder.

Finally, the first end portion 50 of the wear indicating member 44 may have only one arm, and may extend on one side of the piston 26, 34.

The pivot axis Y—Y of the wear indicating member may of course not be radially offset with respect to the axis X—X of the piston 26, although this arrangement is less convenient for purging purposes.

I claim:

1. A friction clutch, comprising friction liners, a clutch casing within which there is arranged a clutch control device which comprises a clutch release bearing (20) and a hydraulic actuating device (26, 34) comprising at least one actuating piston (26), which is coupled to the clutch release bearing (20) for axial straight line movement together, so as to urge the release bearing in axial displacement, wherein the clutch includes a device for indicating wear in the friction liners of the clutch and comprising a wear indicating member (44) having a first end portion (50), a second end portion (600 and a body, which is coupled to the actuating piston (26, 34) for axial straight line movement therewith, and which projects outside the casing (10) via an aperture (48) in the casing (10), so as to transmit, mechanically, information relating to the displacement of the actuating piston (26).

2. A clutch according to claim 1, wherein the aperture (48) is a window.

3. A clutch according to claim 1, wherein a first end portion (50) of the wear indicating member (44) is pivoted to the actuating piston (26), and in that the second end portion (60) of the wear indicating member projects through the aperture (48) of the casing, so as to be displaceable in relation to a member (86) for measuring displacements of the second end portion (60, 82).

4. A clutch according to claim 3, wherein the the measuring member is a graduated visual scale for measurement of the displacements of the second end portion (60, 82) of the wear indicating member (44).

5. A clutch according to claim 3, wherein the second end portion of the wear indicating member (44) comprises a friction element (84) which cooperates with an electrical potentiometer (86).

6. A clutch according to claim 1, wherein a first end portion (50) of the wear indicating member (44) is coupled to the piston (26) for axial straight line movement with it, and is pivoted on the latter about a pivot axis (Y—Y) at right angles to a second axis (X—X) of axial sliding movement of the piston (26).

7. A clutch according to claim 6, wherein the the pivot axis (Y—Y) of the wear indicating member (44) is offset radially with respect to the second axis (X—X) of the piston (26).

8. A clutch according to claim 6, wherein the the first end portion (50) of the wear indicating member (44) is in the form of a fork (50A, 50B).

9. A clutch according to claim 6, wherein the the hydraulic actuating device includes a pressurised fluid supply circuit comprising at least one feed duct which connects the actuating chamber (38) of the piston (26, 34) to a source of fluid under pressure arranged outside the casing (10), and in that at least part (64A) of the duct is formed in the body (46) of the wear indicating member (44).

10. A clutch according to claim 9, wherein the the body of the wear indicating member (44) includes a longitudinal duct (64A), a first end (66A) of which is connected to the actuating chamber (38) for the piston (26, 34) via means (52A) pivoting the first end portion (50A) of the wear indicating member (44) on the piston (26, 34).

11. A clutch according to claim 10, wherein the the second end portion (68A) of the duct (64A) is open outside the clutch casing (10).

12. A clutch according to claim 9, wherein the the supply circuit includes a purge duct (64B), at least part of which is formed in the body (46) of the wear indicating member (44).

* * * * *